May 6, 1952 W. E. EGERTON ET AL 2,595,344
MACHINE FOR USE IN CUTTING AND FILLING CAKES AND THE LIKE
Filed May 9, 1947 2 SHEETS—SHEET 1

Inventors
W. E. Egerton
S. Charlton
By Hazard Downing Deebold Attys

May 6, 1952     W. E. EGERTON ET AL     2,595,344
MACHINE FOR USE IN CUTTING AND FILLING CAKES AND THE LIKE
Filed May 9, 1947                            2 SHEETS—SHEET 2

Inventors
W. E. Egerton
S. Charlton

Patented May 6, 1952

2,595,344

UNITED STATES PATENT OFFICE 2,595,344

MACHINE FOR USE IN CUTTING AND FILLING CAKES AND THE LIKE

William Edward Egerton and Sydney Charlton, Hull, England

Application May 9, 1947, Serial No. 747,150
In Great Britain April 18, 1946

2 Claims. (Cl. 107—1)

This invention has for its object to provide a simple and effective construction of machine for cutting cakes and the like nearly but not quite through and for feeding a filling material into the cut. A known type of cutting machine comprises a rotary table with cups or recesses therein to receive the cakes to be cut and a rotary knife which partially severs the cakes as the table revolves.

The invention comprises a travelling platform with cups thereon into which the cakes are placed, a cutter disposed at an angle to the vertical which partially severs the top of the cake as it passes the cutter by producing an angled slit therein, a wedge shaped member behind the cutter which enters the slit in each cake as it leaves the cutter and opens out such slit, and a nozzle which delivers a charge of filling material into the open slit in each cake.

The invention further comprises the arrangement in which the platform is a rotary horizontal table.

The invention further comprises the arrangement in which the filling material is delivered through a nozzle by a pump plunger actuated when the slit in the cake moves over the nozzle.

The invention further comprises the arrangement in which each cup has a slit therein which the revolving cutter enters as it slits the cake.

The invention further comprises the arrangement in which the cutter passes through a plate which holds the cake in its cup during cutting, the wedge shaped member holding the cake down after cutting.

Figure 1:
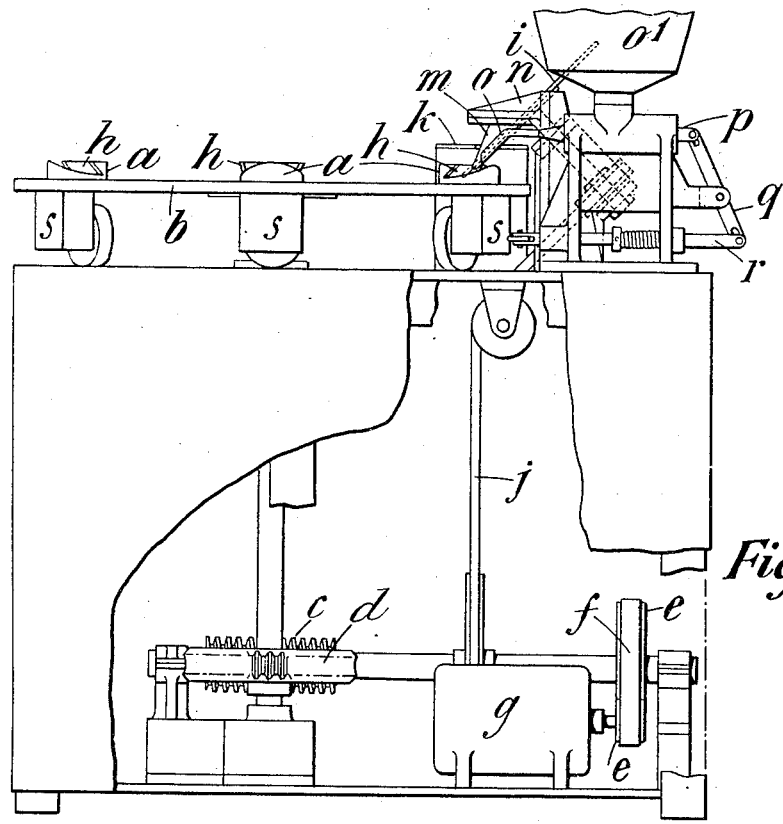
Figure 2:
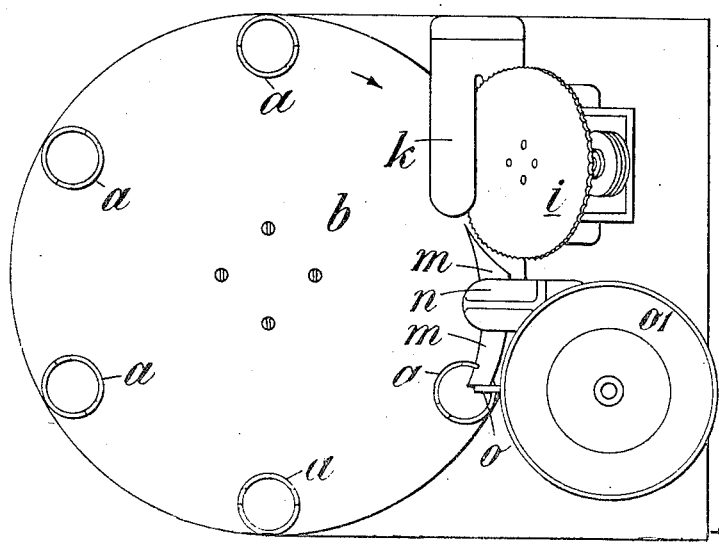
Figure 3:
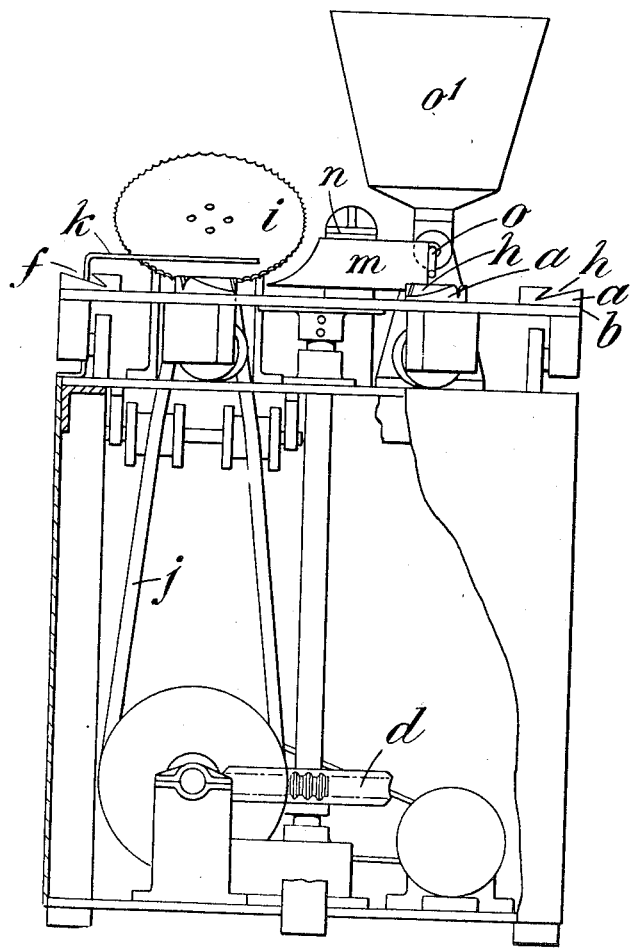

Referring to the accompanying explanatory drawings:

Figure 1 is a front elevation, Figure 2 a plan view and Figure 3 an end elevation showing a machine constructed in one convenient form in accordance with this invention.

The cakes to be cut and filled are placed in cups $a$ in a table $b$ which is revolved by the worm $c$ and worm wheel $d$ and the belt pulleys $e$ and belt $f$ from the motor $g$.

Each cup $a$ has an angular slot $h$ therein at the place where the cake in the cup is to be slit to receive the filling material.

The cake is partly severed with an angular cut by the revolving cutter $i$ which is driven by the belt $j$ from the motor $g$. A plate $k$ comes above the cake which is being cut in order to hold it in its cup $a$.

Immediately behind the cutter $i$ is a part $m$ carried by a bracket $n$ which has a V or wedge shaped configuration and diverges from one end to the other. This part entering the slit produced by the cutter $i$ opens it, widens it and holds it open until the filling material is forced into the slit by the tube $o$ which receives the material from the hopper $o^1$, the material being extruded at the appropriate times by a plunger on the rod $p$ actuated through the lever $q$ and spring loaded rod $r$ by a cam $s$, one of which is situated at each cup $a$.

It will be seen that the cutter $i$ produces the desired angular slit in the cakes in the cups $a$, that the wedge shaped member $m$ enters the slit and opens it out in order that the nozzle $o$ situated at the rear end of the wedge $m$ can charge the cake with the filling material. The cake closes on the material in the slit when the wedge $m$ moves out of the slit. The fitting material is forced through the nozzle $o$ in correct amount and at the right moment for each filling. The plunger $p$ on its out stroke draws material from the hopper $o^1$ and on its instroke forces the charge into the slit in the cake. The wedge member $m$ serves also to hold each cake in its cup after the cutter has made the slit therein.

Our improvement provides a cake cutting and filling machine of simple and reliable construction.

What we claim is:

1. A cake cutting and filling machine, comprising in combination a travelling platform, cups on said platform in which the cakes are placed, each cup being open at the top and having slots extending downwards from two diametrically opposed points on its upper edge at an angle with respect to the vertical, a fixed support alongside the platform, a revolving cutter disc mounted on the fixed support, the disc being at the same angle to the vertical as the slots in the cup and being adapted to enter the slots in each cup as the cup travels past the cutter, a fixed plate under which the cups travel, mounted in close proximity to the cutter and adapted to hold a cake in its cup during the cutting, a wedge-shaped member fixed behind the cutter so that it enters the cut in the cake as the platform travels and opens wide the said cut, a tube adjacent to the rear end of said wedge, and means delivering a measured quantity of filling material through said tube into the slit in the cake when the cake is in position to receive it.

2. A cake cutting and filling machine as claimed in claim 1 and having a platform in the form of a rotary horizontal table, a motor driving the table and also the cutter, a plunger for delivering a measured quantity of filling material into the slit in a cake and means upon the table for actuating the plunger when the cake is in position to receive the filling.

WILLIAM EDWARD EGERTON.
SYDNEY CHARLTON.

REFERENCES CITED

The following references are of record in the file of this patent:

UNITED STATES PATENTS

| Number | Name | Date |
|---|---|---|
| 1,497,863 | Lux et al. | June 17, 1924 |
| 1,643,260 | Siegert | Sept. 20, 1927 |
| 1,716,266 | Flamm | June 4, 1929 |
| 1,777,830 | Estrin | Oct. 7, 1930 |
| 1,871,837 | Dale Brown | Aug. 16, 1932 |